(12) United States Patent
Gally et al.

(10) Patent No.: US 8,362,987 B2
(45) Date of Patent: Jan. 29, 2013

(54) METHOD AND DEVICE FOR MANIPULATING COLOR IN A DISPLAY

(75) Inventors: Brian J. Gally, San Rafael, CA (US); William J. Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 933 days.

(21) Appl. No.: 11/118,605

(22) Filed: Apr. 29, 2005

(65) Prior Publication Data

US 2006/0077149 A1   Apr. 13, 2006

Related U.S. Application Data

(60) Provisional application No. 60/613,491, filed on Sep. 27, 2004, provisional application No. 60/623,072, filed on Oct. 28, 2004, provisional application No. 60/613,535, filed on Sep. 27, 2004.

(51) Int. Cl.
*G09G 3/34* (2006.01)
(52) U.S. Cl. .......................................................... 345/85
(58) Field of Classification Search .................. 345/84, 345/85, 603, 604; 359/291
See application file for complete search history.

(56) References Cited

U.S. PATENT DOCUMENTS

| | | | |
|---|---|---|---|
| 2,677,714 A | 5/1954 | Max | |
| 3,247,392 A | 4/1966 | Thelen | |
| 3,448,334 A | 6/1969 | Frost | |
| 3,653,741 A | 4/1972 | Marks | |
| 3,725,868 A | 4/1973 | Malmer, Jr. et al. | |
| 4,200,472 A | 4/1980 | Chappell | |
| 4,377,324 A | 3/1983 | Durand | |
| 4,389,096 A | 6/1983 | Hori | |
| 4,400,577 A | 8/1983 | Spear | |
| 4,441,789 A | 4/1984 | Pohlack | |
| 4,441,791 A | 4/1984 | Hornbeck | |
| 4,633,031 A | 12/1986 | Todorof | |
| 4,878,741 A | 11/1989 | Fergason | |
| 4,915,479 A | 4/1990 | Clarke | |
| 4,929,061 A | 5/1990 | Tominaga et al. | |
| 4,947,291 A | 8/1990 | McDermott | |
| 4,980,775 A | 12/1990 | Brody | |
| 4,982,184 A | 1/1991 | Kirkwood | |
| 5,022,745 A | 6/1991 | Zayhowski et al. | |
| 5,044,736 A | 9/1991 | Jaskie | |
| 5,136,669 A | 8/1992 | Gerdt | |
| 5,142,414 A | 8/1992 | Koehler | |
| 5,168,406 A | 12/1992 | Nelson | |

(Continued)

FOREIGN PATENT DOCUMENTS

| | | |
|---|---|---|
| CA | 2 490 975 | 1/2004 |
| CN | 1409157 A | 4/2003 |

(Continued)

OTHER PUBLICATIONS

Miles, MW "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.

(Continued)

*Primary Examiner* — Dennis Joseph
(74) *Attorney, Agent, or Firm* — Knobbe, Martens, Olson & Bear, LLP

(57) ABSTRACT

A method and device for manipulating color in a display is disclosed. In one embodiment, a display comprises interferometric display elements formed to have spectral responses that produce white light. In one embodiment, the produced white light is characterized by a standardized white point.

19 Claims, 9 Drawing Sheets

U.S. PATENT DOCUMENTS

| | | | |
|---|---|---|---|
| 5,192,946 A | 3/1993 | Thompson et al. | |
| 5,228,013 A | 7/1993 | Bik et al. | |
| 5,233,385 A | 8/1993 | Sampsell | |
| 5,287,215 A | 2/1994 | Warde et al. | |
| 5,311,360 A | 5/1994 | Bloom et al. | |
| 5,327,263 A * | 7/1994 | Katagiri et al. | 358/471 |
| 5,345,322 A | 9/1994 | Fergason et al. | |
| 5,356,488 A | 10/1994 | Hezel | |
| 5,361,190 A | 11/1994 | Roberts et al. | |
| 5,365,283 A | 11/1994 | Doherty et al. | |
| 5,398,170 A | 3/1995 | Lee | |
| 5,448,314 A | 9/1995 | Heimbuch et al. | |
| 5,452,024 A | 9/1995 | Sampsell | |
| 5,517,347 A | 5/1996 | Sampsell | |
| 5,589,852 A | 12/1996 | Thompson et al. | |
| 5,619,059 A | 4/1997 | Li et al. | |
| 5,619,365 A | 4/1997 | Rhoads et al. | |
| 5,619,366 A | 4/1997 | Rhoads et al. | |
| 5,633,739 A | 5/1997 | Matsuyama | |
| 5,636,185 A | 6/1997 | Brewer et al. | |
| 5,638,084 A | 6/1997 | Kalt | |
| 5,710,656 A | 1/1998 | Goossen | |
| 5,737,115 A | 4/1998 | Mackinlay et al. | |
| 5,739,945 A | 4/1998 | Tayebati | |
| 5,745,281 A | 4/1998 | Yi | |
| 5,751,492 A | 5/1998 | Meyers | |
| 5,754,260 A | 5/1998 | Ooi | |
| 5,771,321 A | 6/1998 | Stern | |
| 5,782,995 A | 7/1998 | Nanya et al. | |
| 5,805,117 A | 9/1998 | Mazurek | |
| 5,815,229 A | 9/1998 | Shapiro | |
| 5,835,255 A * | 11/1998 | Miles | 359/291 |
| 5,853,310 A | 12/1998 | Nishimura | |
| 5,868,480 A | 2/1999 | Zeinali | |
| 5,886,688 A | 3/1999 | Fifield | |
| 5,892,598 A | 4/1999 | Asakawa et al. | |
| 5,914,804 A | 6/1999 | Goossen | |
| 5,933,183 A | 8/1999 | Enomoto | |
| 5,959,763 A | 9/1999 | Bozler et al. | |
| 5,986,796 A | 11/1999 | Miles et al. | |
| 5,991,073 A | 11/1999 | Woodgate et al. | |
| 6,023,373 A | 2/2000 | Inoguchi et al. | |
| 6,028,690 A | 2/2000 | Carter et al. | |
| 6,031,653 A | 2/2000 | Wang | |
| 6,040,937 A * | 3/2000 | Miles | 359/291 |
| 6,046,840 A | 4/2000 | Huibers | |
| 6,055,090 A | 4/2000 | Miles | |
| 6,057,878 A | 5/2000 | Ogiwara | |
| 6,088,102 A | 7/2000 | Manhart | |
| 6,113,239 A | 9/2000 | Sampsell et al. | |
| 6,137,904 A | 10/2000 | Lubin et al. | |
| 6,147,728 A * | 11/2000 | Okumura et al. | 349/106 |
| 6,195,196 B1 | 2/2001 | Kimura et al. | |
| 6,201,633 B1 | 3/2001 | Peeters et al. | |
| 6,213,615 B1 | 4/2001 | Siitari | |
| 6,229,916 B1 | 5/2001 | Ohkubo | |
| 6,243,149 B1 | 6/2001 | Swanson et al. | |
| 6,282,010 B1 | 8/2001 | Sulzbach | |
| 6,285,424 B1 | 9/2001 | Yoshida | |
| 6,288,824 B1 | 9/2001 | Kastalsky | |
| 6,300,558 B1 | 10/2001 | Takamoto | |
| 6,301,000 B1 | 10/2001 | Johnson | |
| 6,323,834 B1 | 11/2001 | Colgan | |
| 6,342,970 B1 | 1/2002 | Sperger et al. | |
| 6,356,378 B1 | 3/2002 | Huibers | |
| 6,381,022 B1 | 4/2002 | Zavracky | |
| 6,400,738 B1 | 6/2002 | Tucker | |
| 6,402,325 B1 | 6/2002 | Yamamoto | |
| 6,411,423 B2 | 6/2002 | Ham | |
| 6,421,054 B1 | 7/2002 | Hill et al. | |
| 6,421,103 B2 | 7/2002 | Yamaguchi | |
| 6,442,124 B1 | 8/2002 | Chung et al. | |
| 6,466,358 B2 | 10/2002 | Tew | |
| 6,480,634 B1 | 11/2002 | Corrigan | |
| 6,483,613 B1 | 11/2002 | Woodgate et al. | |
| 6,520,643 B1 | 2/2003 | Holman et al. | |
| 6,527,410 B2 | 3/2003 | Yamaguchi | |
| 6,549,338 B1 | 4/2003 | Wolverton et al. | |
| 6,570,584 B1 | 5/2003 | Cok et al. | |
| 6,574,033 B1 | 6/2003 | Chui | |
| 6,597,419 B1 | 7/2003 | Okada et al. | |
| 6,597,490 B2 | 7/2003 | Tayebati | |
| 6,630,968 B1 | 10/2003 | Tsuchihashi et al. | |
| 6,636,322 B1 | 10/2003 | Terashita | |
| 6,643,069 B2 | 11/2003 | Dewald | |
| 6,650,455 B2 | 11/2003 | Miles | |
| 6,657,611 B1 | 12/2003 | Sterken | |
| 6,674,562 B1 | 1/2004 | Miles | |
| 6,680,792 B2 | 1/2004 | Miles | |
| 6,738,194 B1 | 5/2004 | Ramirez | |
| 6,747,785 B2 | 6/2004 | Chen et al. | |
| 6,760,146 B2 | 7/2004 | Ikeda et al. | |
| 6,768,555 B2 | 7/2004 | Chen et al. | |
| 6,773,126 B1 | 8/2004 | Hatjasalo | |
| 6,798,469 B2 | 9/2004 | Kimura | |
| 6,806,924 B2 | 10/2004 | Niiyama et al. | |
| 6,811,267 B1 | 11/2004 | Allen et al. | |
| 6,822,780 B1 | 11/2004 | Long | |
| 6,825,969 B2 | 11/2004 | Chen et al. | |
| 6,841,787 B2 | 1/2005 | Almogy | |
| 6,862,029 B1 | 3/2005 | D'Souza et al. | |
| 6,867,896 B2 | 3/2005 | Miles | |
| 6,870,581 B2 | 3/2005 | Li et al. | |
| 6,871,982 B2 | 3/2005 | Holman et al. | |
| 6,882,458 B2 | 4/2005 | Lin et al. | |
| 6,912,022 B2 | 6/2005 | Lin | |
| 6,930,816 B2 | 8/2005 | Mochizuki | |
| 6,967,779 B2 | 11/2005 | Fadel et al. | |
| 6,982,820 B2 | 1/2006 | Tsai | |
| 6,995,890 B2 | 2/2006 | Lin et al. | |
| 6,999,225 B2 | 2/2006 | Lin et al. | |
| 6,999,236 B2 | 2/2006 | Lin et al. | |
| 7,002,726 B2 | 2/2006 | Patel | |
| 7,006,272 B2 | 2/2006 | Tsai | |
| 7,009,754 B2 | 3/2006 | Huibers | |
| 7,016,095 B2 | 3/2006 | Lin | |
| 7,025,464 B2 | 4/2006 | Beeson et al. | |
| 7,034,981 B2 | 4/2006 | Makigaki | |
| 7,038,752 B2 | 5/2006 | Lin | |
| 7,042,643 B2 | 5/2006 | Miles | |
| 7,072,093 B2 | 7/2006 | Piehl et al. | |
| 7,072,096 B2 | 7/2006 | Holman et al. | |
| 7,110,158 B2 | 9/2006 | Miles | |
| 7,113,339 B2 | 9/2006 | Taguchi et al. | |
| 7,123,216 B1 | 10/2006 | Miles | |
| 7,126,738 B2 | 10/2006 | Miles | |
| 7,138,984 B1 | 11/2006 | Miles | |
| 7,142,347 B2 | 11/2006 | Islam | |
| 7,161,728 B2 | 1/2007 | Sampsell et al. | |
| 7,161,730 B2 | 1/2007 | Floyd | |
| 7,172,915 B2 | 2/2007 | Lin et al. | |
| 7,176,861 B2 | 2/2007 | Dedene et al. | |
| 7,187,489 B2 | 3/2007 | Miles | |
| 7,198,873 B2 | 4/2007 | Geh et al. | |
| 7,210,806 B2 | 5/2007 | Holman | |
| 7,218,429 B2 | 5/2007 | Batchko | |
| 7,271,790 B2 | 9/2007 | Hudson et al. | |
| 7,304,784 B2 | 12/2007 | Chui | |
| 7,342,705 B2 | 3/2008 | Chui et al. | |
| 7,342,709 B2 | 3/2008 | Lin | |
| 7,372,449 B2 | 5/2008 | Kodama et al. | |
| 7,385,748 B2 | 6/2008 | Miles | |
| 7,400,439 B2 | 7/2008 | Holman | |
| 7,417,784 B2 | 8/2008 | Sasagawa | |
| 7,483,197 B2 | 1/2009 | Miles | |
| 7,489,428 B2 | 2/2009 | Sampsell | |
| 7,520,642 B2 | 4/2009 | Holman et al. | |
| 7,525,730 B2 | 4/2009 | Floyd | |
| 7,595,811 B2 | 9/2009 | Matsuda | |
| 7,603,001 B2 | 10/2009 | Wang | |
| 7,660,028 B2 | 2/2010 | Lan | |
| 7,701,029 B2 | 4/2010 | Mabuchi | |
| 7,710,632 B2 | 5/2010 | Cummings | |
| 7,719,500 B2 | 5/2010 | Chui | |
| 7,750,886 B2 | 7/2010 | Sampsell | |
| 7,807,488 B2 | 10/2010 | Gally et al. | |
| 7,855,824 B2 | 12/2010 | Gally | |

| | | |
|---|---|---|
| 7,898,521 B2 | 3/2011 | Gally |
| 7,907,319 B2 | 3/2011 | Miles |
| 7,911,428 B2 | 3/2011 | Gally |
| 7,928,928 B2 | 4/2011 | Gally |
| 8,031,133 B2 | 10/2011 | Gally et al. |
| 2001/0019240 A1 | 9/2001 | Takahashi |
| 2001/0049061 A1 | 12/2001 | Nakagaki |
| 2001/0055208 A1 | 12/2001 | Kimura |
| 2002/0006044 A1 | 1/2002 | Harbers |
| 2002/0015215 A1 | 2/2002 | Miles |
| 2002/0024711 A1 | 2/2002 | Miles |
| 2002/0050286 A1 | 5/2002 | Kubota |
| 2002/0054424 A1 | 5/2002 | Miles |
| 2002/0075555 A1 | 6/2002 | Miles |
| 2002/0080465 A1 | 6/2002 | Han |
| 2002/0126364 A1 | 9/2002 | Miles |
| 2002/0154215 A1 | 10/2002 | Schechterman |
| 2002/0191130 A1 | 12/2002 | Liang et al. |
| 2003/0006730 A1 | 1/2003 | Tachibana |
| 2003/0011864 A1 | 1/2003 | Flanders |
| 2003/0043157 A1 | 3/2003 | Miles |
| 2003/0072070 A1 | 4/2003 | Miles |
| 2003/0107692 A1 | 6/2003 | Sekiguchi |
| 2003/0151821 A1 | 8/2003 | Favalora et al. |
| 2003/0160919 A1 | 8/2003 | Suzuki |
| 2003/0161040 A1 | 8/2003 | Ishii |
| 2003/0179383 A1 | 9/2003 | Chen et al. |
| 2003/0206281 A1 | 11/2003 | Jain |
| 2003/0210363 A1 | 11/2003 | Yasukawa |
| 2003/0213514 A1 | 11/2003 | Ortabasi |
| 2003/0214621 A1 | 11/2003 | Kim et al. |
| 2004/0027315 A1 | 2/2004 | Senda et al. |
| 2004/0051929 A1 | 3/2004 | Sampsell et al. |
| 2004/0066477 A1 | 4/2004 | Morimoto et al. |
| 2004/0070711 A1 | 4/2004 | Wen |
| 2004/0080807 A1 | 4/2004 | Chen et al. |
| 2004/0100594 A1 | 5/2004 | Huibers |
| 2004/0113875 A1 | 6/2004 | Miller et al. |
| 2004/0114242 A1* | 6/2004 | Sharp ............................ 359/498 |
| 2004/0115339 A1 | 6/2004 | Ito |
| 2004/0125048 A1 | 7/2004 | Fukuda et al. |
| 2004/0147198 A1 | 7/2004 | Lin et al. |
| 2004/0174583 A1 | 9/2004 | Chen et al. |
| 2004/0184134 A1 | 9/2004 | Makigaki |
| 2004/0188599 A1 | 9/2004 | Viktorovitch |
| 2004/0207897 A1 | 10/2004 | Lin |
| 2004/0209192 A1 | 10/2004 | Lin et al. |
| 2004/0209195 A1 | 10/2004 | Lin |
| 2004/0217919 A1 | 11/2004 | Piehl et al. |
| 2004/0218251 A1 | 11/2004 | Piehl et al. |
| 2004/0233503 A1 | 11/2004 | Kimura |
| 2004/0240032 A1 | 12/2004 | Miles |
| 2005/0002082 A1 | 1/2005 | Miles |
| 2005/0036095 A1 | 2/2005 | Yeh et al. |
| 2005/0042117 A1 | 2/2005 | Lin |
| 2005/0057442 A1 | 3/2005 | Way |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0083352 A1 | 4/2005 | Higgins |
| 2005/0117623 A1 | 6/2005 | Shchukin |
| 2005/0195462 A1 | 9/2005 | Lin |
| 2006/0022966 A1 | 2/2006 | Mar |
| 2006/0066541 A1 | 3/2006 | Gally |
| 2006/0066557 A1 | 3/2006 | Floyd |
| 2006/0066641 A1 | 3/2006 | Gally |
| 2006/0066935 A1 | 3/2006 | Cummings et al. |
| 2006/0067651 A1 | 3/2006 | Chui |
| 2006/0077124 A1 | 4/2006 | Gally |
| 2006/0077125 A1 | 4/2006 | Floyd |
| 2006/0077127 A1 | 4/2006 | Sampsell |
| 2006/0077148 A1 | 4/2006 | Gally et al. |
| 2006/0077512 A1 | 4/2006 | Cummings |
| 2006/0103912 A1 | 5/2006 | Katoh et al. |
| 2006/0130889 A1 | 6/2006 | Li et al. |
| 2006/0201546 A1 | 9/2006 | Yokoyama |
| 2006/0250337 A1 | 11/2006 | Miles |
| 2006/0274243 A1 | 12/2006 | Iijima et al. |
| 2006/0286381 A1 | 12/2006 | Naito |
| 2007/0031097 A1 | 2/2007 | Heikenfeld et al. |
| 2007/0206267 A1 | 9/2007 | Tung |
| 2007/0247704 A1 | 10/2007 | Mignard |
| 2008/0112031 A1 | 5/2008 | Gally |
| 2008/0112039 A1 | 5/2008 | Chui |
| 2008/0151347 A1 | 6/2008 | Chui |
| 2008/0288225 A1 | 11/2008 | Djordjev |
| 2009/0073540 A1 | 3/2009 | Kothari |
| 2009/0086301 A1 | 4/2009 | Gally |
| 2009/0101192 A1 | 4/2009 | Kothari |
| 2009/0151771 A1 | 6/2009 | Kothari |
| 2009/0242024 A1 | 10/2009 | Kothari |
| 2009/0293955 A1 | 12/2009 | Kothari |
| 2009/0296191 A1 | 12/2009 | Floyd |
| 2010/0096006 A1 | 4/2010 | Griffiths |
| 2010/0096011 A1 | 4/2010 | Griffiths |
| 2010/0245370 A1 | 9/2010 | Narayanan |
| 2010/0245975 A1 | 9/2010 | Cummings |
| 2011/0043889 A1 | 2/2011 | Mignard |
| 2011/0128307 A1 | 6/2011 | Gally |
| 2011/0141163 A1 | 6/2011 | Gally et al. |
| 2011/0193770 A1 | 8/2011 | Gally et al. |

FOREIGN PATENT DOCUMENTS

| | | |
|---|---|---|
| CN | 1517743 | 8/2004 |
| DE | 196 22 748 | 12/1997 |
| DE | 103 29 917 A1 | 2/2005 |
| EP | 0 223 136 A | 5/1987 |
| EP | 0 330 361 | 8/1989 |
| EP | 0 366 117 | 5/1990 |
| EP | 0 389 031 | 9/1990 |
| EP | 0 695 959 | 2/1996 |
| EP | 0 786 911 | 7/1997 |
| EP | 0 822 441 | 2/1998 |
| EP | 0 830 032 | 3/1998 |
| EP | 0 855 745 | 7/1998 |
| EP | 1 003 062 | 5/2000 |
| EP | 1 014 161 | 6/2000 |
| EP | 1 205 782 | 5/2002 |
| EP | 1 251 454 | 10/2002 |
| EP | 1298635 A2 | 4/2003 |
| EP | 1 336 876 | 8/2003 |
| EP | 1 341 025 | 9/2003 |
| EP | 1 389 775 | 2/2004 |
| EP | 1 413 543 | 4/2004 |
| EP | 1 640 761 | 3/2006 |
| EP | 1 640 762 | 3/2006 |
| EP | 1 640 767 | 3/2006 |
| EP | 1 670 065 A | 6/2006 |
| EP | 1 767 981 | 3/2007 |
| EP | 0 051 124 A | 4/2009 |
| EP | 2 058 863 A2 | 5/2009 |
| EP | 2 256 537 | 12/2010 |
| EP | 1 800 172 B1 | 2/2011 |
| FR | 2 760 559 | 9/1998 |
| FR | 2760559 | 9/1998 |
| GB | 2 278 222 | 11/1994 |
| GB | 2 315 356 | 1/1998 |
| GB | 2321532 | 7/1998 |
| JP | 02-068513 | 3/1990 |
| JP | 02-151079 A | 6/1990 |
| JP | 04 081816 | 3/1992 |
| JP | 04-238321 A | 8/1992 |
| JP | 05-281479 | 10/1993 |
| JP | 05 281479 | 10/1993 |
| JP | 8-018990 | 1/1996 |
| JP | 08 018990 | 1/1996 |
| JP | 08-184822 | 7/1996 |
| JP | 09 189869 | 7/1997 |
| JP | 09-189910 | 7/1997 |
| JP | 09 281917 | 10/1997 |
| JP | 9-281917 | 10/1997 |
| JP | 10 500224 | 1/1998 |
| JP | 10-222047 | 8/1998 |
| JP | 10 319877 | 12/1998 |
| JP | 11 002712 | 1/1999 |
| JP | 11 064882 | 3/1999 |
| JP | 11 174234 | 7/1999 |
| JP | 11 211999 | 8/1999 |

| | | |
|---|---|---|
| JP | 11-295726 A | 10/1999 |
| JP | 2000 500245 | 1/2000 |
| JP | 2000 514568 | 10/2000 |
| JP | 2001 343514 | 12/2001 |
| JP | 2001-345458 | 12/2001 |
| JP | 2002-062492 | 2/2002 |
| JP | 2002-062505 | 2/2002 |
| JP | 2002 062505 A | 2/2002 |
| JP | 2002-149116 | 5/2002 |
| JP | 2002 174780 | 6/2002 |
| JP | 2002-229023 | 8/2002 |
| JP | 2002 287047 | 10/2002 |
| JP | 2002 328313 | 11/2002 |
| JP | 2003-021821 A | 1/2003 |
| JP | 2003 255324 | 9/2003 |
| JP | 2003 255379 | 9/2003 |
| JP | 2003 295160 | 10/2003 |
| JP | 2003-315732 | 11/2003 |
| JP | 2004-111278 | 4/2004 |
| JP | 2004-117815 | 4/2004 |
| JP | 2004-206049 | 7/2004 |
| JP | 2004-212673 | 7/2004 |
| JP | 2004-212922 | 7/2004 |
| JP | 2004-219843 | 8/2004 |
| JP | 2004-534280 A | 11/2004 |
| JP | 2005-527861 | 9/2005 |
| JP | 2005-308871 | 11/2005 |
| KR | 2002010322 | 2/2002 |
| KR | 2003-0081662 A | 10/2003 |
| KR | 2004-0035678 | 4/2004 |
| TW | 594155 | 6/2004 |
| WO | WO 95/30924 | 11/1995 |
| WO | WO 96/08833 | 3/1996 |
| WO | WO 97/17628 | 5/1997 |
| WO | WO 97/44707 A | 11/1997 |
| WO | WO 97/46908 | 12/1997 |
| WO | WO 99/52006 | 10/1999 |
| WO | WO 99/67680 | 12/1999 |
| WO | WO 01/81994 | 11/2001 |
| WO | WO 02/24570 | 3/2002 |
| WO | WO 02/071132 | 9/2002 |
| WO | WO 03/007049 A1 | 1/2003 |
| WO | WO 03/056876 | 7/2003 |
| WO | WO 03/073151 | 9/2003 |
| WO | WO 03/100756 | 12/2003 |
| WO | WO 2004/006003 | 1/2004 |
| WO | WO 2004/068182 | 8/2004 |
| WO | WO 2004/068460 | 8/2004 |
| WO | WO 2006/036421 | 4/2006 |
| WO | WO 2006/036524 | 4/2006 |
| WO | WO 2006/036540 | 4/2006 |
| WO | WO 2006/036559 | 4/2006 |
| WO | WO 2007/127046 | 11/2007 |

OTHER PUBLICATIONS

EP Search Report for Co-Pending EP application No. EP 05255636.2-02217, dated Jan. 19, 2006.
European Search Report for European Patent Application No. 06077032.8 dated May 25, 2007, 8 pages.
Austrian Search Report No. 167/2005, mailed on Jul. 14, 2005.
"CIE Color System," from website hyperphysics.phy-astr.gsu.edu.hbase/vision/cie.html, (Cited in Notice of Allowance mailed Jan. 11, 2008 in U.S. Appl. No. 11/188,197.
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani, et. al., "Surface micromachined tuneable interferometer array", Sensors and Actuators A, vol. A43, No. 1/3, May 1, 1994, pp. 17-23.
Conner, "Hybrid Color Display Using Optical Interference Filter Array," SID Digest, pp. 577-580 (1993).
Manzardo, et al., "Optics and Actuators for Miniaturized Spectrometers," International Conference on Optical MEMS, 12(6):23-24 (Dec. 2003).
Miles, et al., Digital Paper for reflective displays, Journal of the Society for Information Display, San Jose, CA, vol. 11, No. 1, 2003, pp. 209-215.
Miles, Interferometric Modulation: MOEMS as an enabling technology for high-performance reflective displays, Proceedings of the SPIE, 4985:28, pp. 131-139, Jan. 2003.
Miles, Mark, W., "A New Reflective FPD Technology Using Interferometric Modulation", The Proceedings of the Society for Information Display (May 11-16, 1997).
Miles, MW "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284.
Partial European Search Report for App. No. 06077032.8 dated Feb. 22, 2007; (European Publication No. EP 1767981).
Extended European Search Report for App. No. 05255636.2 dated Apr. 28, 2006; (European Publication No. EP 1640762).
Extended European Search Report for App. No. 05255657.8 dated Dec. 7, 2005; (European Publication No. EP 1640767).
Extended European Search Report for App. No. 05255635.4 dated Jan. 19, 2006; (European Publication No. EP 1640761).
Austrian Search Report dated Aug. 12, 2005 in U.S. Appl. No. 11/118,110.
Austrian Search Report in U.S. Appl. No. 11/083,841 mailed Jul. 14, 2005.
Austrian Search Report for U.S. Appl. No. 11/140,561 dated Jul. 12, 2005.
Austrian Search Report for U.S. Appl. No. 11/051,258 dated May 13, 2005.
ISR and WO dated Dec. 30, 2005 in International Application No. PCT/US2005/030526 (International Publication No. WO 2006/036421).
ISR and WO dated Jan. 10, 2006 in International Application No. PCT/US2005/032773 (International Publication No. WO 2006/36559).
ISR and WO dated Nov. 2, 2007 in International Application No. PCT/US07/08790 (International Publication No. WO 2007/127046).
ISR and WO dated Jan. 11, 2006 in International Application No. PCT/US2005/032426 (Publication No. WO 2006/036524).
Chinese Office Action for Chinese Application No. 200510105840.5, dated May 9, 2008.
U.S. Office Action for U.S. Appl. No. 11/208,085, dated Dec. 10, 2008.
Mark W. Miles, "A New Reflective FPD Technology Using interfermotric modulation" Journal of the Society or Information Display vol. 5 No. 4 pp. 379-382, 1997.
Mark W. Miles, "Interferometric Modulation: A MEMS Based Technology for the Modulation of Light," Final Program and Proceedings IS&T's 50th Annual Conference, pp. 674-677, 1997.
Mark W. Miles, "MEMS-based Interferometric Modulator for Display Applications," Proceedings of SPIE Micromachined Devices and Components, pp. 20-28, 1999.
Examination Report in Australian Application No. 2005204236, dated Dec. 14, 2009.
Official Communication in European Application No. 05 255 636.2, dated Mar. 1, 2010.
Official Communication in Japanese Application No. 2005-259341, dated Oct. 7, 2008.
Official Communication in European Application No. 06 077 032.8, dated Mar. 1, 2010.
Office Action in U.S. Appl. No. 11/188,197, dated Jun. 25, 2007.
Amendment in U.S. Appl. No. 11/188,197, dated Nov. 26, 2007.
Notice of Allowance in U.S. Appl. No. 11/188,197, dated Jan. 11, 2008.
Request for Continued Examination and Information Disclosure Statement in U.S. Appl. No. 11/188,197, dated Apr. 10, 2008.
Notice of Allowance in U.S. Appl. No. 11/188,197, dated Jul. 9, 2008.
Request for Continued Examination and Information Disclosure Statement in U.S. Appl. No.11/188,197, dated Oct. 8, 2008.
Notice of Allowance in U.S. Appl. No. 11/188,197, dated Dec. 18, 2008.
Examiner Interview Summary in U.S. Appl. No. 11/188,197, dated Feb. 10, 2009.
Applicant Interview Summary in U.S. Appl. No. 11/188,197, dated Mar. 9, 2009.
Official Communication in Chinese Application No. 2005-80030995, dated Mar. 7, 2008.

Official Communication in European Application No. 05 792 614, dated Jul. 19, 2007.
Summons to Attend Oral Proceedings in European Application No. 05 792 614, dated Apr. 4, 2008.
Official Communication in Russian Application No. 2007115885/28, dated Nov. 17, 2009.
Substantive Examination Adverse Report in Malaysian Application No. PI 20054446, dated Nov. 20, 2009.
Official Communication in Chinese Application No. 2005-80032161, dated Aug. 7, 2009.
Official Communication in Chinese Application No. 2005-80032161, dated Nov. 14, 2008.
Notice of Allowance in U.S. Appl. No. 11/178,211, dated Jun. 28, 2010.
Amendment in U.S. Appl. No. 11/178,211, dated Mar. 31, 2010.
Office Action in U.S. Appl. No. 11/178,211, dated Dec. 31, 2009.
Amendment in U.S. Appl. No. 11/178,211, dated Sep. 21, 2009.
Office Action in U.S. Appl. No. 11/178,211, dated Jun. 22, 2009.
Official Communication in Chinese Application No. 200510105840, dated Feb. 27, 2009.
Official Communication in European Application No. 05 255 636.2, dated May 1, 2007.
Official Communication in Mexican Application No. PA/a/2005/009863 dated Apr. 4, 2008.
Extended European Search Report in Application No. 06077032, dated May 25, 2007.
Office Action in U.S. Appl. No. 12/427,670, dated Oct. 19, 2010.
Minutes of the Oral Proceedings in European Application No. 05 792 314, dated Aug. 6, 2008.
Official Communication in European Application No. 05 792 314, dated Aug. 6, 2008.
International Search Report and Written Opinion in PCT/US2005/030526(International Publication No. WO 2006/036421) dated Dec. 30, 2005.
Request for Continued Examination in U.S. Appl. No. 11/178,211, dated Sep. 27, 2010.
Amendment in U.S. Appl. No. 11/178,211, dated Sep. 30, 2010.
Official Communication in Japanese Application No. 2007-533541, dated Aug. 13, 2010.
Office Action in Mexican Application No. MX/a/2007/003581, dated Aug. 27, 2009.
Chemical Properties Handbook, McGraw-Hill, 1999, Refractive Index, Dipole Moment and Radius of Gyration; Inorganic Compounds, No. 151: O2Si.
Hohlfeld et al., "Micro-machined tunable optical filters with optimized band-pass spectrum," 12th International Conference on Transducers, Solid-State Sensors, Actuators and Microsystems, vol. 2, pp. 1494-1497, Jun. 2003.
Lau "Infrared characterization for microelectronics" New Jersey: World Scientific, Oct. 1999, pp. 55-71, ISBN 981-02-2352-8.
Nakagawa et al. "Wide-Field-of-View Narrow-Band Spectral Filters Based on Photonic Crystal Nanocavities", Optical Society of America, Optics Letters, vol. 27, No. 3, pp. 191-193, 2002.
Petschick et al. "Fabry-Perot-Interferometer," available at http://pl.physik.tu-berlin.de/groups/pg279/protokolless02/04_fpi.pdf, pp. 50-60, May 14, 2002.
American Institute of Physics Handbook, "Glass Polarizing and Interference Filters," pp. 6-172-6-178, 1982.
Jerman et al. "A Miniature Fabry-Perot Interferometer Fabricated Using Silicon Micromaching Techniques," IEEE Electron Devices Society, pp. 372-375, 1988.
Jerman et al. "A Miniature Fabry-Perot Interferometer with a Corrugated Silicon Diaphragm Support", pp. 140-144, 1990.
Magel, "Integrated Optic Devices Using Micromachined Metal Membranes", SPIE vol. 2686, 0-8194-2060-3, pp. 54-63, 1996.
Mehregany et al., "MEMS applications in Optical Systems," IEEE/LEOS 1996 Summer Topical Meetings, pp. 75-76, Aug. 1996.
Miles, Mark, W., "A New Reflective FPD Technology Using Interferonnetric Modulation", The Proceedings of the Society for Information Display (May 11-16, 1997).
Raley et al. "A Fabry-Perot Microinterferometer for Visible Wavelengths," IEEE Solid-State Sensor and Actuator Workshop, Hilton Head, SC, pp. 170-173 (1992).
Sperger et al. "High Performance Patterned All-Dielectric Interference Colour Filter for Display Applications", SID Digest, pp. 81-83, (1994).
Walker et al. "Electron-beam-tunable Interference Filter Spatial Light Modulator", Optics Letters vol. 13, No. 5, pp. 345-347, (May 1988).
Wu, "Design of a Reflective Color LCD Using Optical Interference Reflectors", ASIA Display '95, pp. 929-931, (Oct. 1995).
International Search Report and Written Opinion in PCT/US2005/032633; International Publication No. WO 2006/036540) dated Feb. 6, 2006.
International Preliminary Report on Patentability in Application No. PCT/US2005/030526, dated Mar. 27, 2007.
International Preliminary Report on Patentability in Application No. PCT/US2005/032773, dated Mar. 27, 2007.
International Preliminary Report on Patentability in PCT/US2005/032633; International Publication No. WO 2006/036540) dated Apr. 5, 2007.
Office Action in U.S. Appl. No. 11/213,659 dated Oct. 29, 2008.
Amendment and Response in U.S. Appl. No. 11/213,659 dated Mar. 30, 2009.
Notice of Allowance in U.S. Appl. No. 11/213,659 dated Jul. 20, 2009.
Request for Continued Examination and Informatin Disclosure Statement in U.S. Appl. No. 11/213,659, dated Oct. 19, 2009.
Notice of Allowance and Fees Due in U.S. Appl. No. 11/213,659, dated Nov. 18, 2009.
Request for Continued Examination and Information Disclosure Statement in U.S. Appl. No. 11/213,659, dated Feb. 17, 2010.
Amendment and Information Disclosure Statement in U.S. Appl. No. 11/213,659, dated Feb. 25, 2010.
Notice of Allowance in U.S. Appl. No. 11/213,659, dated Apr. 8, 2010.
Request for Continued Examination, Information Disclosure Statement, and Petition to Withdraw from Issue in U.S. Appl. No. 11/213,659, dated Aug. 18, 2010.
Petition Grant in U.S. Appl. No. 11/213,659, dated Aug. 19, 2010.
Amendment in U.S. Appl. No. 11/213,659, dated Aug. 27, 2010.
Notice of Allowance in U.S. Appl. No. 11/213,659, dated Sep. 21, 2010.
U.S. Appl. No. 12/831,517, dated Jul. 7, 2010.
Notice of Abandonment in U.S. Appl. No. 12/831,517, dated Mar. 28, 2011.
U.S. Application No. 13/016,107, dated Jan. 28, 2011.
Preliminary Amendment in U.S. Appl. No. 13/016,107, dated Apr. 25, 2011.
Second Preliminary Amendment in U.S. Appl. No. 13/016,107, dated May 24, 2011.
Office Action in European Application No. EP 05800920.0 dated May 21, 2008.
Summons to attend oral proceedings in European Application No. 05800920, dated Dec. 4, 2009.
Result of consultation in European Application No. 05800920, dated Feb. 23, 2010.
Minutes of the Oral Proceedings in European Application No. 05 800 920.1, dated May 20, 2010.
Notice of Intention to Grant in European Application No. 05800920, dated Jun. 2, 2010.
Comments on Statement of Reasons for Allowance in U.S. Appl. No. 11/188,197, dated Mar. 17, 2009.
Interview Summary in U.S. Appl. No. 12/427,670, dated Feb. 8, 2011.
Amendment and Summary of Interview in U.S. Appl. No. 12/427,670, dated Feb. 18, 2011.
Summary of Interview in U.S. Appl. No. 12/427,670, dated Mar. 7, 2011.
Supplemental Amendment in U.S. Appl. No. 12/427,670, dated Mar. 10, 2011.
Office Action and Interview Summary in U.S. Appl. No. 12/427,670, dated Jun. 10, 2011.
Notice of Allowance in U.S. Appl. No. 11/178,211, dated Nov. 19, 2010.

Amendment After Allowance Under 37 C.F.R. § 1.312, Issue Fee, and Information Disclosure Statement in U.S. Appl. No. 11/178,211, dated Feb. 17, 2011.
Response to Rule 312 Communication in U.S. Appl. No. 11/178,211, dated Mar. 9, 2011.
Response to Rule 312 Communication in U.S. Appl. No. 11/178,211, dated May 6, 2011.
Request for Continued Examination and Petition to Withdraw after Payment of Issue Fee in U.S. Appl. No. 11/178,211, dated May 13, 2011.
Notice of Allowance in U.S. Appl. No. 11/178,211, dated May 25, 2011.
U.S. Appl. No. 13/032,519, dated Feb. 22, 2011.
Office Action in Chinese Application No. 200580032161, dated Dec. 3, 2010.
Office Action in Chinese Application No. 200580032161, dated May 18, 2011.
Official Communication in Japanese Application No. 2007-533541, dated Mar. 15, 2011.
Office Action in Russian Application No. 2007115885/28, dated Sep. 24, 2010.
Notice of Allowance in Korean Patent Application No. 2005-0089441, dated Feb. 16, 2012.
Official Communication in Korean Patent Application No. 2005-0089441, dated Sep. 22, 2011.

* cited by examiner

| | Column Output Signals | |
|---|---|---|
| | +$V_{bias}$ | -$V_{bias}$ |
| 0 | Stable | Stable |
| +Δ$V$ | Release | Actuate |
| −Δ$V$ | Actuate | Release |

Row Output Signals

METHOD AND DEVICE FOR MANIPULATING COLOR IN A DISPLAY

RELATED APPLICATIONS

This application claims the benefit of U.S. Provisional Application No. 60/613,491 filed Sep. 27, 2004; U.S. Provisional Application No. 60/623,072 filed Oct. 28, 2004; and U.S. Provisional Application No. 60/613,535 filed Sep. 27, 2004. Each of the foregoing applications is incorporated by reference in its entirety.

FIELD

The field of the invention relates to microelectromechanical systems (MEMS).

BACKGROUND

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment is a display. The display includes a plurality of interferometric modulators. The plurality of interferometric modulators includes at least one interferometric modulator configured to output red light, at least one interferometric modulator configured to output green light, and at least one interferometric modulator configured to output blue light. The combination of said output red light, said output green light, and said output blue light combine to produce said output white light having a standardized white point.

One embodiment is a display. The display includes at least one interferometric modulator, the modulator comprising a reflective surface configured to be positioned at a distance from a partially reflective surface. The distance of the at least one modulator is selected so as to produce white light characterized by a standardized white point.

Another embodiment is a display. The display includes a plurality of displays elements, each comprising a reflective surface configured to be positioned at a distance from a partially reflective surface. The plurality of display elements configured to output white light characterized by a standardized white point.

Another embodiment is a method of fabricating a display. The method includes forming a plurality of display elements configured to output light. Each of said plurality of display elements is formed comprising a reflective surface configured to be positioned at distance from partially reflective surface. The plurality of display elements is formed having said respective distances selected so that white light produced by the plurality display element is characterized by a standardized white point.

Another embodiment is a method of fabricating a display. The method includes forming a plurality of display elements configured to output light. Each of the plurality of display elements comprises a reflective surface configured to be positioned at distance from partially reflective surface. Each of the display elements are formed with respective areas from which light is reflected. Each of the respective areas is selected so that white light produced by the plurality display element is characterized by a standardized white point.

Another embodiment is a display including first means for outputting white light characterized by a standardized white point, and second means for outputting white light characterized by a standardized white point, the first and second means comprising microelectromechanical systems.

Another embodiment is a display. The display includes at least one interferometric modulator configured to selectively reflect green light incident thereon. The display further includes at least one filter associated with the at least one interferometric modulator and configured to selectively transmit visible wavelengths associated with magenta light and substantially filter other visible wavelengths when illuminated with white light.

Another embodiment is a method of fabricating a display. The method includes forming at least one interferometric modulator configured to selectively reflect green light incident thereon. The method further includes forming a layer of material positioned with respect to the modulator such that light modulated by the at least one interferometric modulator is filtered by the layer of material. The layer of material selectively transmits visible wavelengths associated with magenta light and substantially filters other visible wavelengths when illuminated with white light.

Another embodiment is a display. The display includes first means for outputting light, second means for outputting light, and third means for outputting light. The output light of the first, second, and third means is combined to produce white light characterized by a standardized white point. The first, second, and third means comprising microelectromechanical systems.

Another embodiment is a display. The display includes at least one first display element configured to selectively output cyan light. The display further includes at least one second display element configured to selectively output yellow light and positioned proximately to the at least one first display element. Each of the at least one first display element and the at least one second display element comprises reflective surface and a partially reflective surface.

Another embodiment is a method of fabricating a display. The method includes forming at least one first interferometric modulator configured to selectively reflect cyan light incident thereon. The method also includes forming at least one second interferometric modulator proximately to the at least one first interferometric modulator. The at least one second modulator is configured to selectively reflect yellow light incident thereon.

One embodiment is a display. The display includes means for outputting green light and means for outputting magenta light. One of the means for outputting green light and the means for outputting magenta light comprise a microelectromechanical system.

Another embodiment is a display. The display includes means for outputting cyan light and means for outputting yellow light. The means for outputting cyan light and the means for outputting yellow light comprise microelectromechanical systems.

DETAILED DESCRIPTION OF PREFERRED EMBODIMENTS

Various embodiments include displays comprising interferometric display elements that are formed to produce white light having selected spectral properties. One embodiment includes a display that produces white light using interferometric modulators that are configured to reflect cyan and yellow light. Another embodiment includes a display that produces white light using interferometric modulators that reflect green light through a color filter that selectively transmits magenta light. Embodiments also include displays that reflect white light that is characterized by a standardized white point. The white point of such a display may be different from the white point of light illuminating the display.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
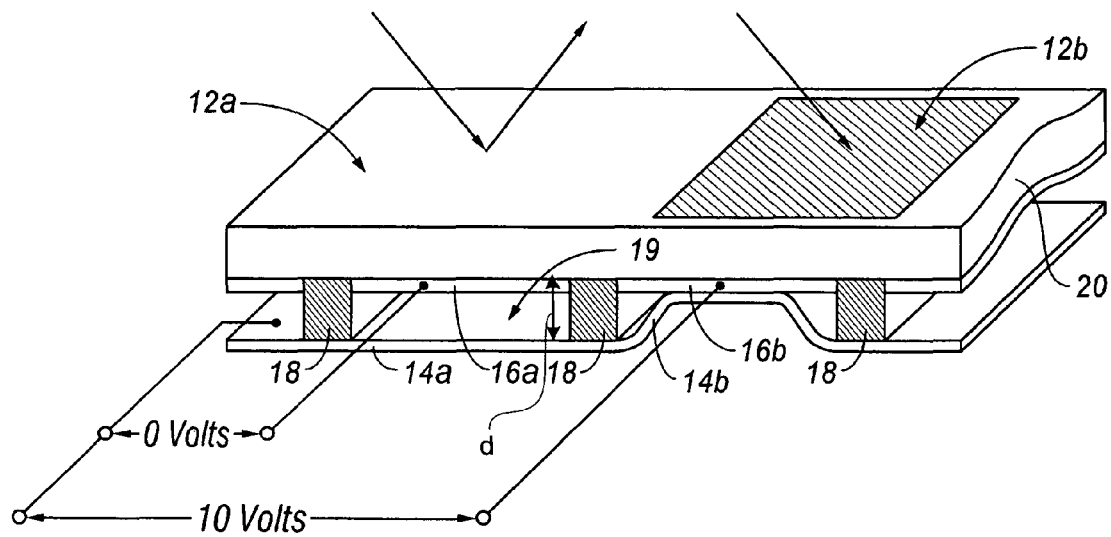
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
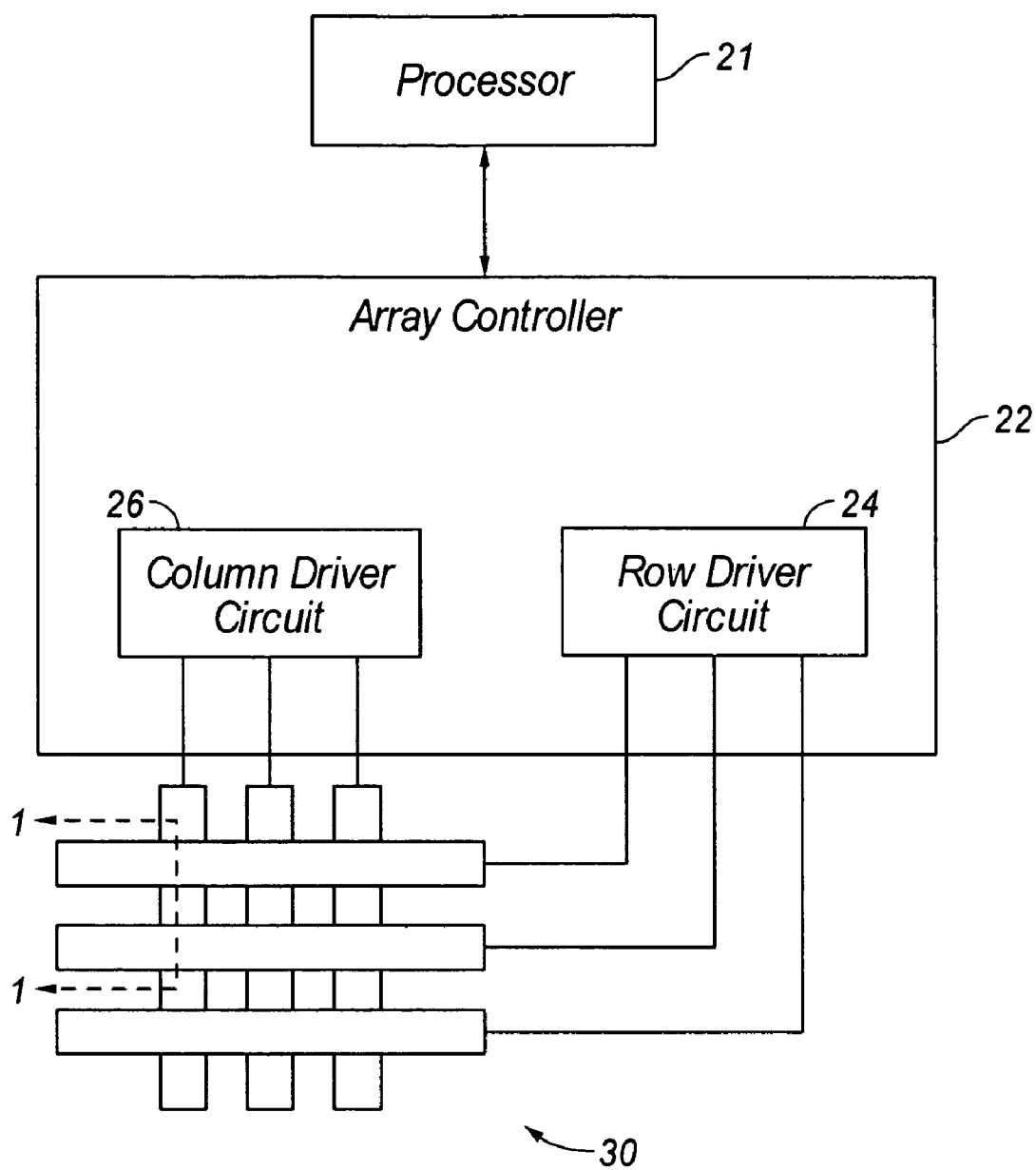
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
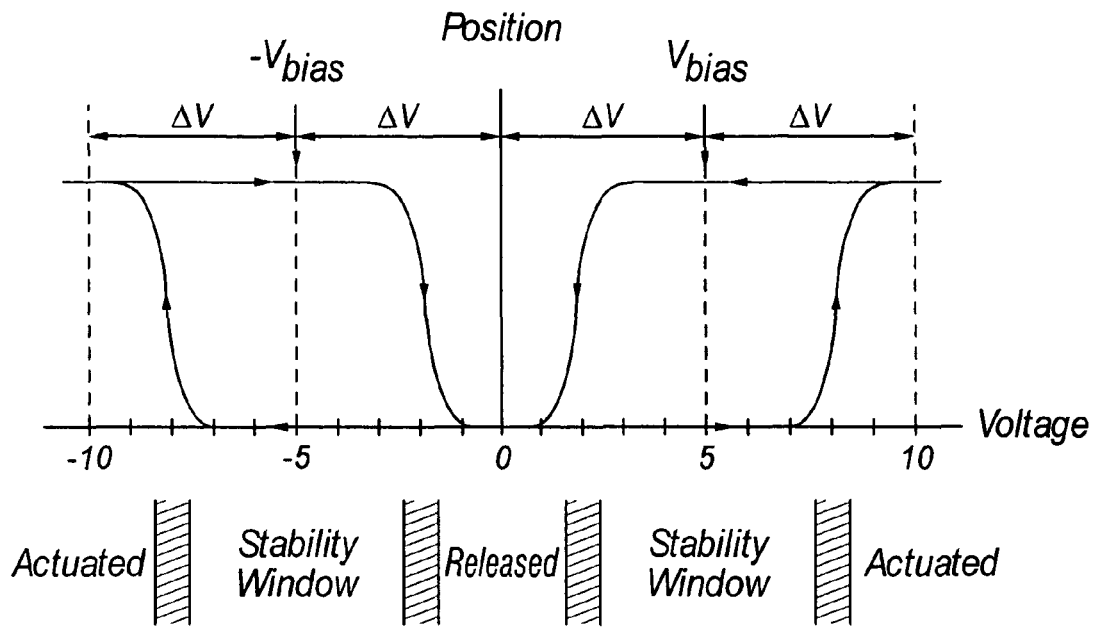
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
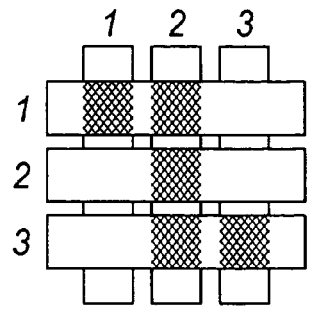
FIGS. 5A and 5B illustrate one exemplary timing diagram for row and column signals that may be used to write a frame of display data to the 3×3 interferometric modulator display of FIG. 2.
Figure 5B:
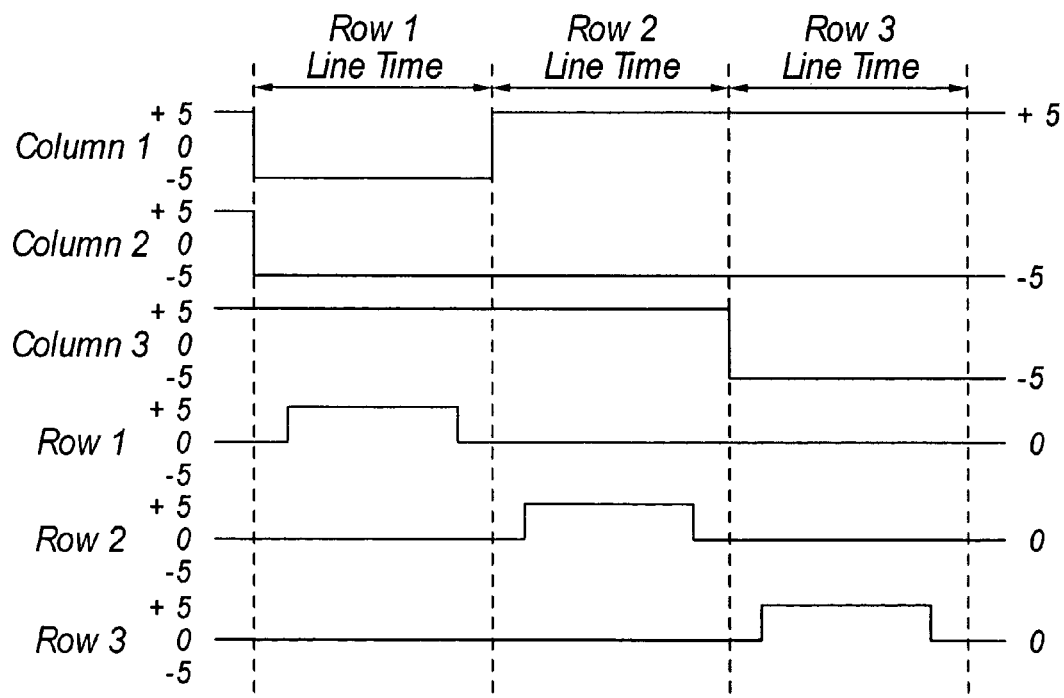

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
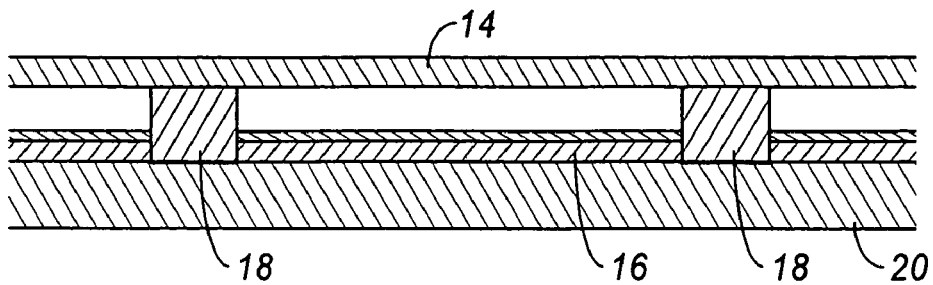
FIG. 6A is a cross section of the device of FIG. 1.
Figure 6B:
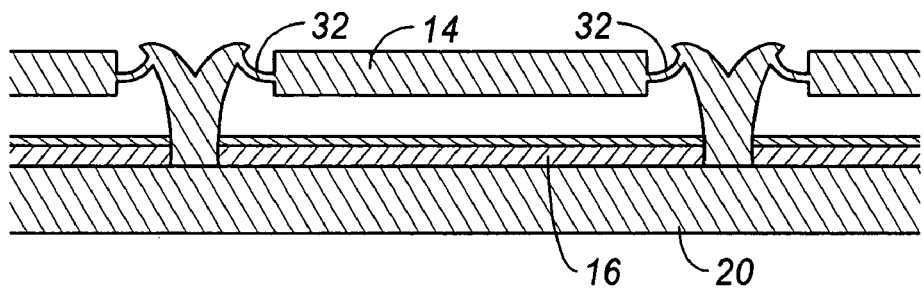
FIG. 6B is a cross section of an alternative embodiment of an interferometric modulator.
Figure 6C:
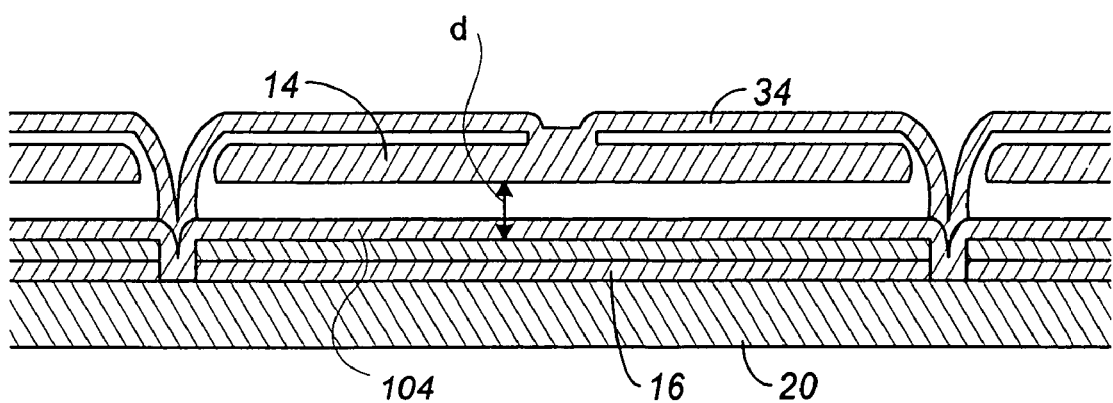
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. In addition, a layer 104 of dielectric material is formed on the fixed layer. The production of various types of interferometric devices is described in a variety of published documents, including, for example, U.S. Published Application No. 2004/0051929. A wide variety of well known techniques may be used to produce the above described structures involving a series of material deposition, patterning, and etching steps.

As discussed above with reference to FIG. 1, the modulator 12 (i.e., both modulators 12a and 12b) includes an optical cavity formed between the mirrors 14 (i.e., mirrors 14a and 14b) and 16 (mirrors 16a and 16b, respectively). The characteristic distance, or effective optical path length, d, of the optical cavity determines the resonant wavelengths, λ, of the optical cavity and thus of the interferometric modulator 12. A peak resonant visible wavelength, λ, of the interferometric modulator 12 generally corresponds to the perceived color of light reflected by the modulator 12. Mathematically, the optical path length d is equal to ½ N λ, where N is an integer. A given resonant wavelength, λ, is thus reflected by interferometric modulators 12 having optical path lengths d of ½ λ (N=1), λ (N=2), 3/2 λ (N=3), etc. The integer N may be referred to as the order of interference of the reflected light. As used herein, the order of a modulator 12 also refers to the order N of light reflected by the modulator 12 when the mirror 14 is in at least one position. For example, a first order red interferometric modulator 12 may have an optical path length d of about 325 nm, corresponding to a wavelength λ of about 650 nm. Accordingly, a second order red interferometric modulator 12 may have an optical path length d of about 650 nm. Generally, higher order modulators 12 reflect light over a narrower range of wavelengths, e.g., have a higher "Q" value, and thus produce colored light that is more saturated. The saturation of the modulators 12 that comprise a color pixel affects properties of a display such as the color gamut and white point of the display. For example, in order for a display using a second order modulator 12 to have the same white point or color balance as a display that includes a first order modulator reflecting the same general color of light, the second order modulator 12 may be selected to have a different central peak optical wavelength.

Note that in certain embodiments such as illustrated in FIG. 1, the optical path length, d, is substantially equal to the distance between the mirrors 14 and 16. Where the space between the mirrors 14 and 16 comprises only a gas (e.g., air) having an index of refraction of approximately 1, the effective optical path length is substantially equal to the distance between the mirrors 14 and 16. Other embodiments, such as illustrated in FIGS. 6C, include the layer 104 of dielectric material. Such dielectric materials typically have an index of refraction greater than one. In such embodiments, the optical cavity is formed to have the desired optical path length d by selecting both the distance between the mirrors 14 and 16 and the thickness and index of refraction of the dielectric layer 104, or of any other layers between the mirrors 14 and 16. For example, in the embodiment illustrated in FIGS. 6c, in which the optical cavity includes the layer 104 of a dielectric in addition to the air gap, the optical path length d is equal to $d_1 n_1 + d_2 n_2$, where $d_1$ is the thickness of layer 1, $n_1$ is the index of refraction of layer 1 and similarly $d_2$ is the thickness of layer 2 and $n_2$ is the index of refraction of layer 2.

Figure 7:
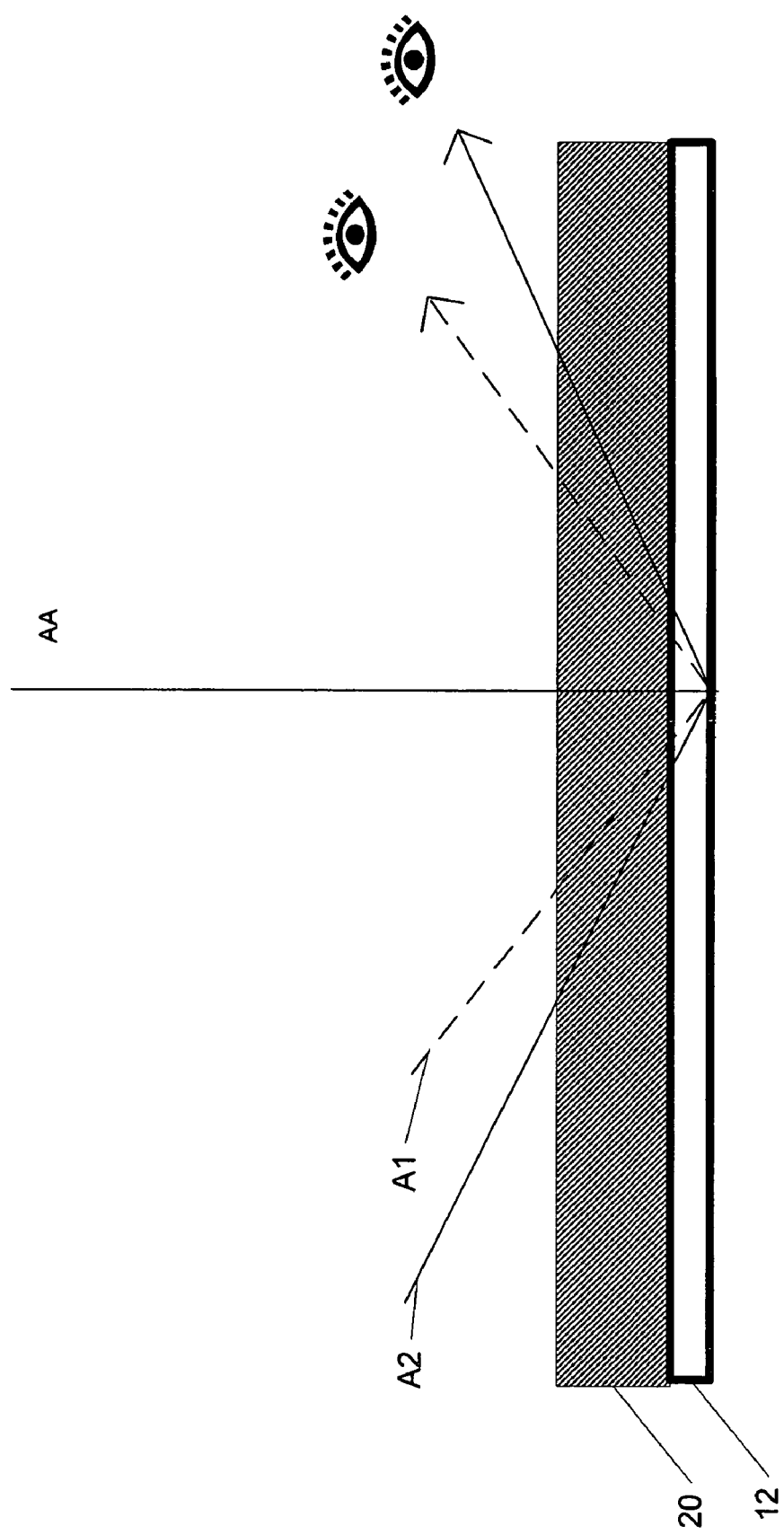
FIG. 7 is a side cross-sectional view of an interferometric modulator illustrating optical paths through the modulator.

Generally, the color of light reflected by an interferometric modulator 12 shifts when the modulator 12 is viewed from different angles. FIG. 7 is a side cross-sectional view of an interferometric modulator 12 illustrating optical paths through the modulator 12. The color of light reflected from the interferometric modulator 12 may vary for different angles of incidence (and reflection) with respect to an axis AA as illustrated in FIG. 7. For example, for the interferometric modulator 12 shown in FIG. 7, as light travels along the off-axis path $A_1$, the light is incident on the interferometric modulator at a first angle, reflects from the interferometric modulator, and travels to a viewer. The viewer perceives a first color when the light reaches the viewer as a result of optical interference between a pair of mirrors in the interferometric modulator 12. When the viewer moves or changes his/her location and thus view angle, the light received by the viewer travels along a different off-axis path $A_2$ corresponding to a second different angle of incidence (and reflection). Optical interference in the interferometric modulator 12 depends on optical path length of light propagated within the modulator, d. Different optical path lengths for the different optical paths $A_1$ and $A_2$ therefore yield different outputs from the interferometric modulator 12. With increasing view angle, the effective optical path of the interferometric modulator is decreased according to the relationship $2d \cos\beta = N\lambda$, where β is the view angle (the angle between the normal to the display and the incident light). With increasing view angle, the peak resonant wavelength of the reflected light is decreased. The user therefore perceives different colors depending on his or her angle of view. As described above, this phenomenon is referred to as a "color shift." This color shift is typically identified with reference to a color produced by an interferometric modulator 12 when viewed along the axis AA.

Another consideration in the design of displays incorporating interferometric modulators 12 is the generation of white light. "White" light generally refers to light that is perceived by the human eye to include no particular color, i.e., white light is not associated with a hue. While black refers to an absence of color (or light), white refers to light that includes such a broad spectral range that no particular color is perceived. White light may refer to light having a broad spectral range of visible light at approximately uniform intensity. However, because the human eye is sensitive to certain wavelengths of red, green, and blue light, white can be created by mixing intensities of colored light to produce light that has one or more spectral peaks which is perceived by the eye as "white." Moreover, the color gamut of a display is the range of colors that the device is able to reproduce, e.g., by mixing red, green, and blue light.

White point is the hue that is considered to be generally neutral (gray or achromatic) of a display. The white point of a display device may be characterized based on a comparison of white light produced by the device with the spectral content of light emitted by a black body at a particular temperature ("black body radiation"). A black body radiator is an idealized object that absorbs all light incident upon the object and which reemits the light with a spectrum dependent on the temperature of the black body. For example, the black body spectrum at 6,500° K. may be referred to as white light having a color temperature of 6,500° K. Such color temperatures, or white points of approximately 5,000°-10,000° K are generally identified with daylight.

The International Commission on Illumination (CIE) promulgates standardized white points of light sources. For example, light source designations of "d" refer to daylight. In particular, standard white points $D_{55}$, $D_{65}$, and $D_{75}$, which correlate with color temperatures of 5,500° K., 6,500° K., and 7,500° K., are standard daylight white points.

A display device may be characterized by the white point of the white light produced by a display. As with light from other light sources, human perception of a display is at least partially determined by the perception of white light from the display. For example, a display or light source having a lower white point, e.g., D55, may be perceived as having a yellow tone by a viewer. A display having a higher temperature white point, e.g., D75 may be perceived as having a "cooler" or bluer tone to a user. Users generally respond more favorably to displays having higher temperature white points. Thus, controlling the white point of a display desirably provides some control over a viewer's response to a display. Embodiments of the interferometric modulator array 30 may be configured to produce white light in which the white point is selected to conform to a standardized white point under one or more anticipated lighting conditions.

White light can be produced by the pixel array 30 by including one or more interferometric modulators 12 for each pixel. For example, in one embodiment, the pixel array 30 includes pixels of groups of red, green, and blue interferometric modulators 12. As discussed above, the colors of the interferometric modulators 12 may be selected by selecting the optical path length d using the relation of $d=\frac{1}{2} N \lambda$. In addition, the balance, or relative proportions, of the colors produced by each pixel in the pixel array 30 may be further affected by the relative reflective areas of each of the interferometric modulators 12, e.g., of the red, green, and blue interferometric modulators 12. Further, because the modulators 12 selectively reflect incident light, the white point of reflected light from the pixel array 30 of interferometric modulators 12 is generally dependent on the spectral characteristics of incident light. In one embodiment, the white point of reflected light may be configured to be different than the white point of incident light. For example, in one embodiment, the pixel array 30 may be configured to reflect D75 light when used in D65 sunlight.

In one embodiment, the distances d and areas of the interferometric modulators 12 in the pixel array 30 are selected so that white light produced by the pixel array 30 corresponds to a particular standardized white point in an anticipated lighting condition, e.g., in sunlight, under fluorescent light, or from a front light positioned to illuminate the pixel array 30. For example, the white point of the pixel array 30 may be selected to be $D_{55}$, $D_{65}$, or $D_{75}$ in particular lighting conditions. Moreover, the light reflected by the pixel array 30 may have a different white point than the light of an anticipated or configured light source. For example, a particular pixel array 30 may be configured to reflect D75 light when viewed under D65 sunlight. More generally, the white point of a display may be selected with reference to a source of illumination configured with the display, e.g., a front light, or with reference to a particular viewing condition. For example, a display may be configured to have a selected white point, e.g., D55, D65, or D75, when viewed under anticipated or typical sources of illumination such as incandescent, fluorescent, or natural light sources. More particularly, a display for use in a handheld device, for example, may be configured to have a selected white point when viewed under sunlight conditions. Alternatively, a display for use in an office environment may be configured to have a selected white point, e.g., D75, when illuminated by typical office fluorescent lights.

Table 1 illustrates optical path lengths of one embodiment. In particular, Table 1 illustrates the air gap of red, green, and blue interferometric modulators in two exemplary embodiments of the pixel array 30 that produce $D_{65}$, and $D_{75}$ white light using modulators 12 of substantially equal reflective areas. Table 1 assumes a dielectric layer comprising two layers, 100 nm of $Al_2O_3$ and $SiO_2$ of 400 nm. Table 1 also assumes substantially identical reflective areas for each of the red, green and blue interferometric modulators 12. One of skill in the art will recognize that a range of equivalent air gap distances can be obtained by varying the thickness or index of refraction of the dielectric layer.

TABLE 1

| Modulator Color | D65 white | D75 white (more blue) |
|---|---|---|
| Red | 200 (nm) | 195 (nm) |
| Green | 125 (nm) | 110 (nm) |
| Blue | 310 (nm) | 315 (nm) |

It is to be recognized that in other embodiments, different distances d and areas of modulators 12 may be selected to produce other standardized white point settings for different viewing environments. Further, the red, green, and blue modulators 12 may also be controlled so as to be in reflective or non-reflective states for different amounts of time so as to further vary the relative balance of reflected red, green, and blue light, and thus the white point of reflected light. In one embodiment, the ratio of reflective areas of each of the color modulators 12 may be selected so as to control the white point in different viewing environments. In one embodiment, the optical path length d may be selected so as to correspond to a common multiple of more than one visible resonant wavelength, e.g., first, second, or third order peaks of red, green, and blue, so that the interferometric modulator 12 reflects white light characterized by three visible peaks in its spectral response. In such an embodiment, the optical path length d is selected so that the white light produced corresponds to a standardized white point.

In addition to groups of red, green, and blue interferometric modulators 12 in the pixel array 30, other embodiments include other ways of generating white light. For example, one embodiment of the pixel array 30 includes cyan and yellow interferometric modulators 12, i.e., interferometric modulators 12 that have respective separation distances d so as to produce cyan and yellow light. The combined spectral response of the cyan and yellow interferometric modulators 12 produces light with a broad spectral response that is perceived as "white." The cyan and yellow modulators are positioned proximately so that a viewer perceives such a combined response. For example, in one embodiment, the cyan modulators and yellow modulators are arranged in adjacent rows of the pixel array 30. In another embodiment, the cyan modulators and yellow modulators are arranged in adjacent columns of the pixel array 30.

Figure 8:
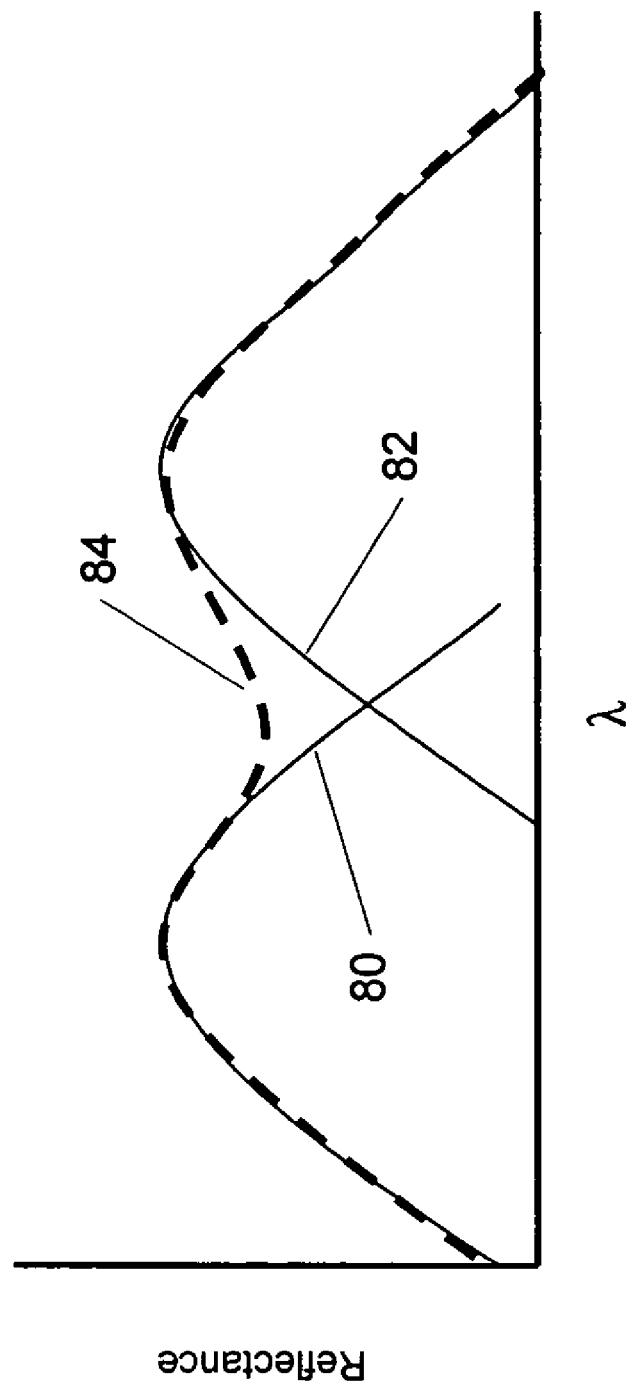
FIG. 8 is a graphical diagram illustrating the spectral response of one embodiment that includes cyan and yellow interferometric modulators to produce white light.

FIG. 8 is a graphical diagram illustrating the spectral response of one embodiment that includes cyan and yellow interferometric modulators 12 to produce white light. The horizontal axis represents the wavelength of reflected light. The vertical axis represents the relative reflectance of light incident on the modulators 12. A trace 80 illustrates the response of the cyan modulator, which is a single peak centered in the cyan portion of the spectrum, e.g., between blue and green. A trace 82 illustrates the response of the yellow modulator, which is a single peak centered in the yellow portion of the spectrum, e.g., between red and green. A trace 84 illustrates the combined spectral response of a pair of cyan and yellow modulators 12. The trace 84 has two peaks at cyan and yellow wavelengths but is sufficiently uniform across the visible spectrum so that reflected light from such modulators 12 is perceived as white.

In one embodiment, the pixel array 30 includes a first order yellow interferometric modulator and a second order cyan interferometric modulator. When such a pixel array 30 is viewed from increasingly larger off-axis angles, light reflected by the first order yellow modulator is shifted toward the blue end of the spectrum, e.g., the modulator at a certain angle has an effective d equal to that of a first order cyan. Concurrently, light reflected by the second order cyan modulator shifts to correspond to light from the first order yellow modulator. Thus, the overall combined spectral response is broad and relatively uniform across the visible spectrum even as the relative peaks of the spectrum shift. Such pixel array 30 thus produces white light over a relatively large range of viewing angles.

In one embodiment, a display having a cyan and yellow modulators may be configured to produce white light having a selected standardized white point under one or more viewing conditions. For example, the spectral response of the cyan modulator and of the yellow modulator may be selected so that reflected light has a white point of D55, D65, D75, or any other suitable white point under selected illumination conditions that include D55, D65, or D75 light such as sunlight for a display suited for outdoor use. In one embodiment, the modulators may be configured to reflect light that has a different white point than incident light from an expected or selected viewing condition.

Figure 9:
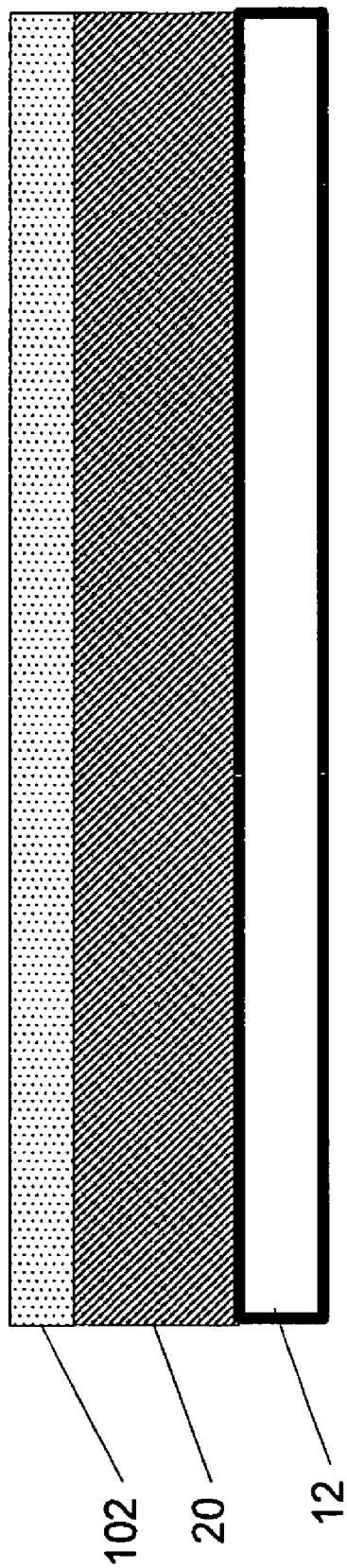
FIG. 9 is a side cross-sectional view of the interferometric modulator having a layer of material for selectively transmitting light of a particular color.

FIG. 9 is a side cross-sectional view of the interferometric modulator 12 having a layer 102 of material for selectively transmitting light of a particular color. In an exemplary embodiment, the layer 102 is on the opposite side of the substrate 20 from modulator 12. In one embodiment, the layer 102 of material comprises a magenta filter through which green interferometric modulators 12 are viewed. In one embodiment, the layer 102 of material is a dyed material. In one such embodiment, the material is a dyed photoresist material. In one embodiment, the green interferometric modulators 12 are first order green interferometric modulators. The filter layer 102 is configured to transmit magenta light when illuminated with a broadly uniform white light. In the exemplary embodiment, light is incident on the layer 20 from which filtered light is transmitted to the modulator 12. The modulator 12 reflects the filtered light back through the layer 102. In such an embodiment, the light passes through the layer 102 twice. In such an embodiment, the thickness of the layer 102 of material may be selected to compensate for, and utilize, this double filtering. In another embodiment, a front light structure may be positioned between the layer 102 and the modulator 12. In such an embodiment, the layer 102 of material acts only on light reflected by the modulator 12. In such embodiments, the layer 102 is selected accordingly.

Figure 10:
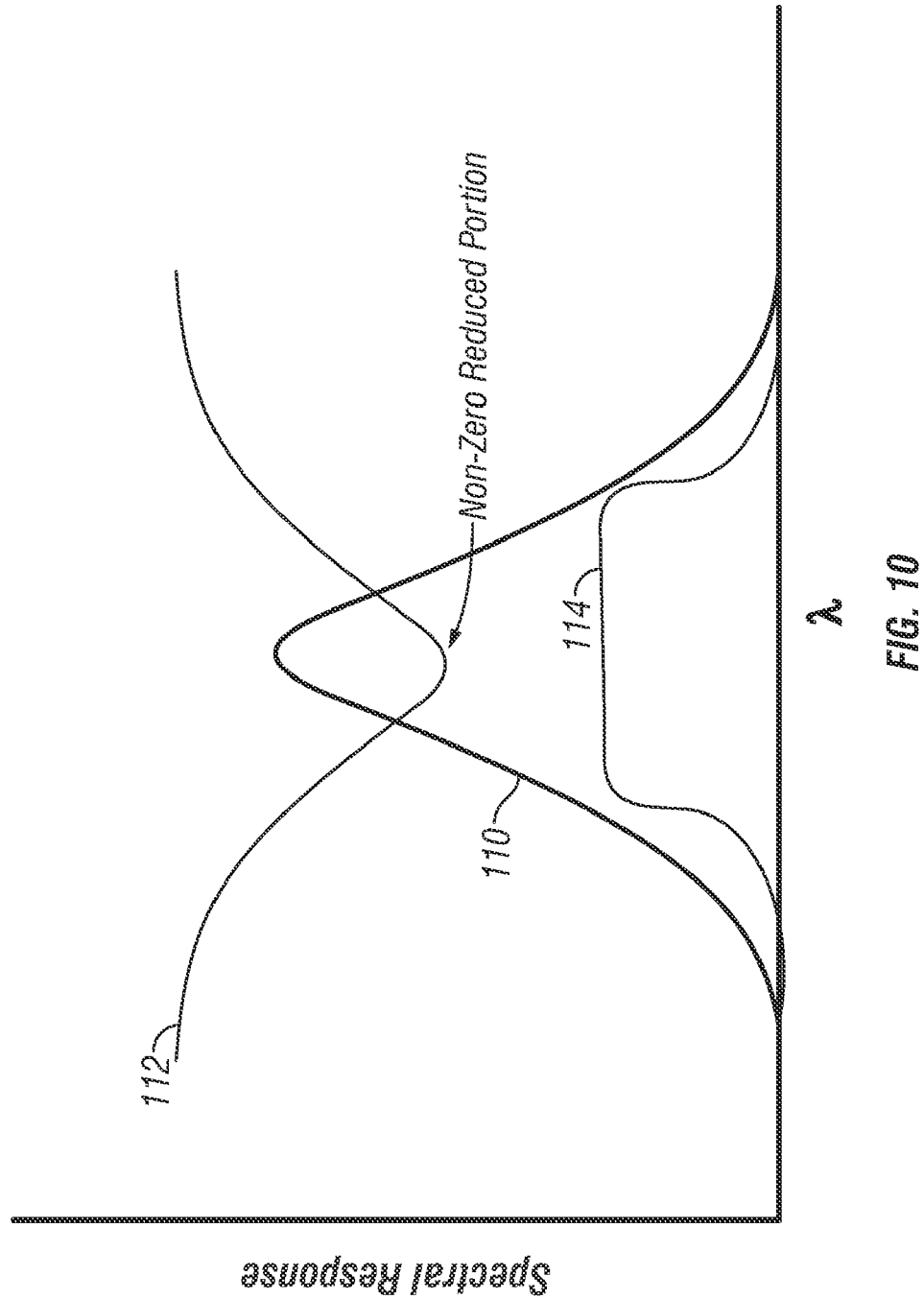
FIG. 10 is a graphical diagram illustrating the spectral response of one embodiment that includes green interferometric modulators and a "magenta" filter layer to produce white light.

FIG. 10 is a graphical diagram illustrating the spectral response of one embodiment that includes the green interferometric modulators 12 and the "magenta" filter layer 102. The horizontal axis represents the wavelength of reflected light. The vertical axis represents the relative spectral response of light incident on the green modulator 12 and filter layer 102 over the visible spectrum. A trace 110 illustrates the response of the green modulator 12, which is a single peak centered in the green portion of the spectrum, e.g., near the center of the visible spectrum. A trace 112 illustrates the response of the magenta filter formed by the layer of material 102. The trace 112 has two relatively flat portions on either side of a central u-shaped minimum. The trace 112 thus represents the response of a magenta filter that selectively transmits substantially all red and blue light while filtering light in the green portion of the spectrum. A trace 114 illustrates the combined spectral response of the pairing of the green modulator 12 and the filter layer 102. The trace 114 illustrates that the spectral response of the combination is at a lower reflectance level than the green modulator 12 due to the filtering of light by the filter layer 102. However, the spectral response is relatively uniform across the visible spectrum so that the filtered, reflected light from the green modulator 12 and the magenta filter layer 102 is perceived as white.

In one embodiment, a display having a green modulator 12 with the magenta filter layer 102 may be configured to produce white light having a selected standardized white point under one or more viewing conditions. For example, the spectral response of the green modulator 12 and of the magenta filter layer 102 may be selected so that reflected light has a white point of D55, D65, D75, or any other suitable white point under selected illumination conditions that include D55, D65, or D75 light such as sunlight for a display suited for outdoor use. In one embodiment, the modulator 12 and filter layer 102 may be configured to reflect light that has a different white point than incident light from an expected or selected viewing condition.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A display comprising:
   at least one interferometric modulator configured to selectively reflect light incident thereon, the at least one modulator having a first spectral response across substantially the visible light spectrum, the first spectral response further having a spectral peak centered in the green portion of the visible light spectrum; and
   at least one filter positioned in front of the at least one interferometric modulator so as to receive the selectively reflected light from the at least one interferometric modulator and configured to selectively transmit visible wavelengths associated with magenta light, the filter having a second spectral response characterizing transmission through the filter over the visible spectrum, the second spectral response having two portions corresponding to transmission of red and blue wavelengths and a non-zero reduced portion of the spectrum therebetween,
   wherein a combination of the at least one interferometric modulator and the at least one filter has a third spectral response lower than the first spectral response of the at least one interferometric modulator due to the at least one filter being configured to remove at least a portion of the said light selectively reflected by the at least one interferometric modulator to output white light, and
   wherein the at least one interferometric modulator includes a reflective surface and a partially reflective surface defining an optical cavity, the optical cavity having an optical path length that is substantially equal to one half of a wavelength associated with green light.

2. The display of claim 1, wherein the filter includes an absorption filter.

3. The display of claim 1, wherein the filter is configured to filter light incident on the at least one interferometric modulator and to filter light reflected by the interferometric modulator.

4. The display of claim 1, wherein the at least one interferometric modulator and the filter produce white light having a standardized white point.

5. The display of claim 4, wherein the standardized white point is a standard white point D55 which correlates with a color temperature of 5,500° K.

6. The display of claim 4, wherein the standardized white point is a standard white point D65 which correlates with a color temperature 6,500° K.

7. The display of claim 4, wherein the standardized white point is a standard white point D75 which correlates with a color temperature 7,500° K.

8. The display of claim 1, further comprising:
   a processor that is configured to communicate with the at least one interferometric modulator, the processor being configured to process image data; and
   a memory device that is configured to communicate with the processor.

9. The display of claim 8, further comprising a driver circuit configured to send at least one signal to the at least one interferometric modulator.

10. The display of claim 9, further comprising a controller configured to send at least a portion of the image data to the driver circuit.

11. A display comprising:
    means for modulating light, the modulating means selectively reflecting light incident thereon, and having a first spectral response across substantially the visible light spectrum, the first spectral response further having a spectral peak centered in the green portion of the visible light spectrum; and
    means for filtering positioned in front of the means for modulating light so as to receive the selectively reflected light from the means for modulating light, the filtering means selectively transmitting visible wavelengths associated with magenta light, the filtering means having a second spectral response characterizing transmission through the filtering means over the visible spectrum, the second spectral response having two portions corresponding to transmission of red and blue wavelengths and a non-zero reduced portion of the spectrum therebetween,
    wherein the means for modulating includes an electromechanical system and wherein a combination of the means for modulating light and the means for filtering has a third spectral response lower than the first spectral response of the means for modulating light due to the means for filtering being configured to remove at least a portion of the light selectively reflected by the means for modulating light to output white light, and
    wherein the modulating means includes a reflective surface and a partially reflective surface defining an optical cavity, the optical cavity having an optical path length that is substantially equal to one half of a wavelength associated with green light.

12. The display of claim 11, wherein the filtering means includes an absorption filter.

13. The display of claim 11, wherein the modulating means and the filtering means produce white light having a standardized white point.

14. The display of claim 13, wherein the standardized white point is a standard white point D55 which correlates with a color temperature of 5,500° K.

15. The display of claim 13, wherein the standardized white point is a standard white point D65 which correlates with a color temperature 6,500° K.

16. The display of claim 13, wherein the standardized white point is a standard white point D75 which correlates with a color temperature 7,500° K.

17. The display of claim 11, wherein the filtering means is configured to filter light incident on the modulating means and to filter light reflected by the modulating means.

18. The display of claim 11, wherein the means for modulating light includes a means for interferometrically modulating light.

19. The display of claim 11, wherein the means for modulating light includes an interferometric modulator.

* * * * *